United States Patent [19]

Wiernicki

[11] Patent Number: 4,487,556
[45] Date of Patent: Dec. 11, 1984

[54] LOW COST ELECTROMAGNETIC FLUID PUMP

[75] Inventor: Michael V. Wiernicki, Trumansburg, N.Y.

[73] Assignee: Facet Enterprises, Incorporated, Tulsa, Okla.

[21] Appl. No.: 404,159

[22] Filed: Aug. 2, 1982

[51] Int. Cl.³ .............................................. F04B 17/04
[52] U.S. Cl. .................................... 417/417; 417/566; 417/550; 318/130
[58] Field of Search ............... 417/417, 418, 241, 415, 417/416, 550, 565, 566, 410; 310/89; 318/120, 125, 126, 127, 132, 134, 130

[56] References Cited

U.S. PATENT DOCUMENTS

| | | | |
|---|---|---|---|
| 3,162,324 | 12/1964 | Houser | 417/566 X |
| 3,179,055 | 4/1965 | Kalert, Jr. | 417/566 X |
| 3,380,387 | 4/1968 | Kofink | 417/417 |
| 3,445,693 | 5/1969 | Crawshaw et al. | 310/89 X |
| 3,479,959 | 11/1969 | Christensen | 417/417 |
| 3,601,509 | 8/1971 | Kreitchman | 417/417 |
| 4,047,852 | 9/1977 | O'Connor et al. | 417/415 |
| 4,086,518 | 4/1978 | Wilkinson | 417/417 X |
| 4,102,610 | 7/1978 | Taboada et al. | 417/417 |
| 4,122,378 | 10/1978 | Brown | 417/417 X |
| 4,212,601 | 7/1980 | Ina | 417/366 X |
| 4,306,843 | 12/1981 | Arai | 417/417 |
| 4,363,980 | 12/1982 | Petersen | 310/30 X |
| 4,389,169 | 6/1983 | De Dionigi | 417/417 |

FOREIGN PATENT DOCUMENTS

| | | | |
|---|---|---|---|
| 3038015 | 5/1981 | Fed. Rep. of Germany | 417/415 |
| 3104018 | 12/1981 | Fed. Rep. of Germany | 417/410 |
| 2480363 | 10/1981 | France | 417/552 |

*Primary Examiner*—William L. Freeh
*Assistant Examiner*—Paul F. Neils
*Attorney, Agent, or Firm*—Remy J. VanOphem

[57] ABSTRACT

A low cost electromagnetic fluid pump having molded structural plastic housing components, a biased reciprocating hollow piston, and a pair of plastic flapper valves providing for a unidirectional fluid flow is disclosed. An integrated circuit timer periodically energizes a solenoid coil producing an oscillating magnetic field reciprocating the piston.

9 Claims, 5 Drawing Figures

LOW COST ELECTROMAGNETIC FLUID PUMP

BACKGROUND OF THE INVENTION

1. Field of the Invention

The invention is related to the field of fluid pumps and in particular to electromagnetic reciprocating piston fluid pumps.

2. Description of the Prior Art

Reciprocating piston electromagnetic fluid pumps as disclosed in the patents to Parker U.S. Pat. No., 2,994,792 and Wertheimer, et al, U.S. Pat. No. 3,381,611 have obtained wide commercial acceptance, but in a highly competitive field, material and fabrication costs and improvements in operation are very important. Most of these pumps have metal housings and associated parts which necessitate expensive machining operations which effectively increase the cost of the pump.

Disclosed herein is a low cost electromagnetic pump designed to take advantage of injection molding using structural plastics.

SUMMARY OF THE INVENTION

The invention is a small electromagnetic fluid pump having injection molded plastic housing components. A magnetically permeable cylindrical piston is oscillated against the force of a biasing member, by an oscillating magnetic field. The oscillating magnetic field is generated by a solenoid coil energized by an oscillator circuit incorporating an integrated circuit timer. Unidirectional fluid flow through the pump is achieved through a pair of mylar flapper valves disposed on either side of a biasing member.

One advantage of the pump is that the use of injected molded structural plastic parts significantly reduces the cost of the pump. Another advantage of the pump is the use of an integrated circuit timer which significantly reduces the assembly cost of the driver circuit for the solenoid coil. These and other advantages of the disclosed pump will become apparent from reading the specification in combination with the drawings.

DETAILED DESCRIPTION OF THE PREFERRED EMBODIMENT

Figure 1:
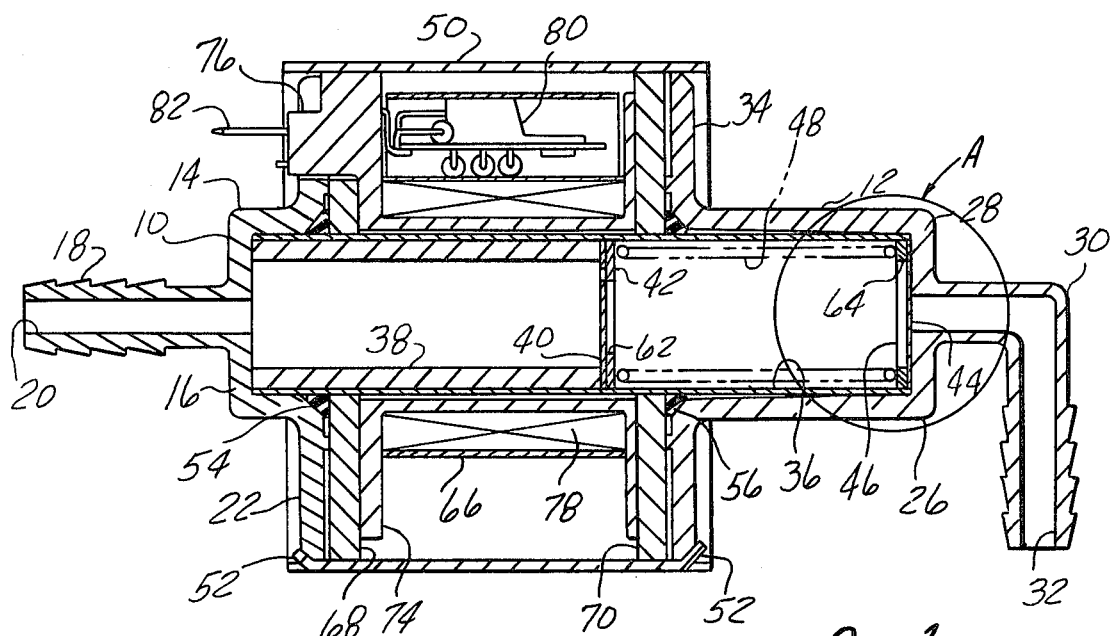
FIG. 1 is a cross-sectional view taken substantially along 1—1 of FIG. 2 of the pump.
Figure 2:
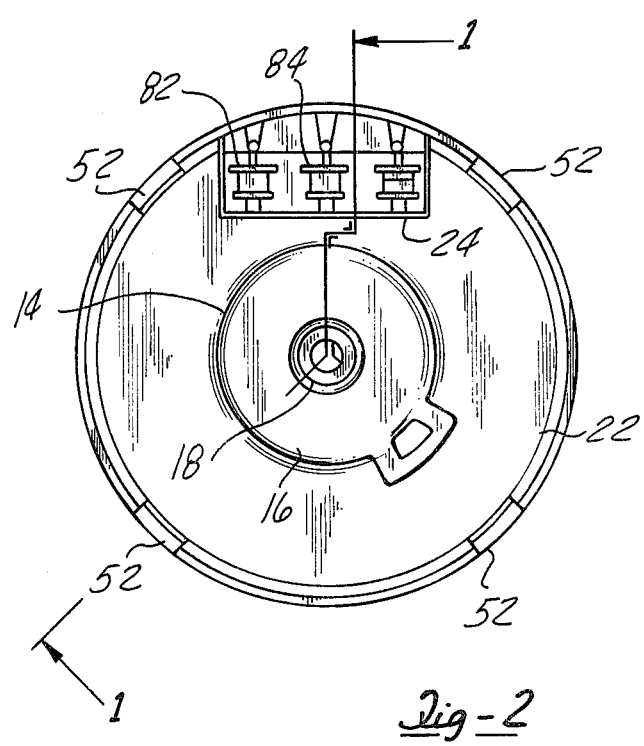
FIG. 2 is an end view of the outlet end of the pump.

Referring to FIGS. 1 and 2, the housing of the pump has an injection molded outlet cap 10 and an injection molded inlet cap 12 made from a structural plastic such as Minlon ® manufactured by E. I. Dupont or Valox ®420 made by General Electric.

The outlet cap 10 has a first cylindrical section 14 closed at one end by a first end section 16. An integral externally serrated hose mount 18 protrudes from the external surface of the first end section 16 concentric with the first cylindrical section 14. An outlet port 20 concentrically passes through the first end section 16 and the serrated hose mount 18. A first radial flange 22 is formed at the end of the first cylindrical section 14 opposite the first end section 16. The first radial flange 22 has a generally rectangular cutout 24 proximate the outer periphery of the first radial flange.

The inlet cap 12 has a second cylindrical section 26 concentric with and having the same internal diameter as the first cylindrical section 14. A second end section 28 encloses the second cylindrical section 26 at the end opposite the outlet cap 10. An elbow shaped inlet hose mount 30 extends from the external surface of the end section 28 and is externally serrated at the end opposite the second end section 28 as shown in FIG. 1. An inlet port 32 passes concentrically through the elbow shaped inlet hose mount 30 and the second end section 28 into the internal chamber defined by the second cylindrical section 26. The inlet cap 12 further has a second radial flange 34 integrally formed at the end of the second cylindrical section 26 opposite the second end section 28. The first and second radial flanges 22 and 34 have the same external diameters.

A thin cylindrical brass piston guide 36 is disposed at one end inside the first cylindrical section 14 and, at the other end, inside of the second cylindrical section 26 and abuts at its ends with the first and second end sections 16 and 28.

A magnetically permeable cylindrical piston 38 is slidably disposed inside of the piston guide 36 at the end adjacent to the first end section 16. A first mylar flapper valve member 40 is disposed between the end of the piston 38 facing the second end section 28 and a first washer member 42. A second mylar flapper valve member 44 is disposed between the internal face of the second end section 28 and a second washer member 46. A biasing member, such as a spring 48 is disposed between the first washer member 42 and the second washer member 46. The spring 48 produces a force sufficient to hold the first washer member 42 and the first flapper valve member against the face of the piston 38 and hold the second washer member 46 and the second flapper valve member 44 against the internal face of the second end section 28. The spring 48 also produces a force urging the piston 38 towards the outlet port 20.

A metal sleeve 50 encloses the volume between the first and second radial flanges 22 and 34. Eight tabs 52 equally spaced about the opposite ends of the sleeve 50 are bent to engage the periphery of the first and second radial flanges 22 and 34 and hold the internal surfaces of the outlet cap 10 and the inlet cap 12, respectively, against the ends of the piston guide 36.

Figure 5:
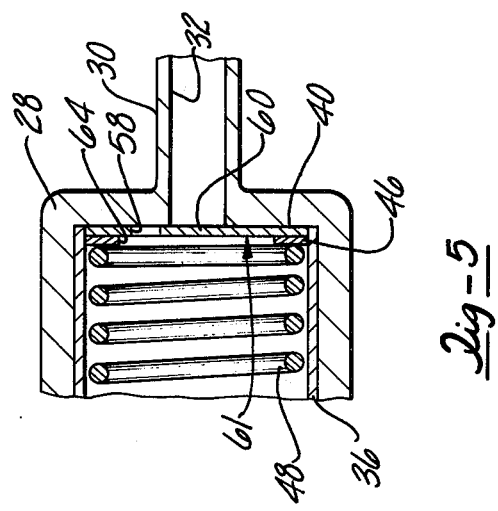
FIG. 5 is an exploded partial section view of the details in circle A of FIG. 1.
Figure 3:
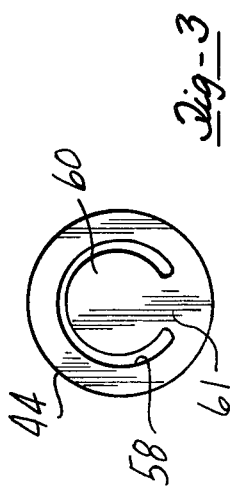
FIG. 3 is an end view of the flapper valve.

The details of the first and second valves 40 and 44 are illustrated in FIG. 3 and FIG. 5, which are exploded partial sections of the relationship of the valve and the washer at the second end of the pump. Referring to FIGS. 3 and 5, the first and second mylar flapper valves 40 and 44 include a circular disk of mylar approximately 0.2 millimeters thick having a diameter slightly smaller than the internal diameter of the piston guide 36. A circular slot 58 approximately 1 millimeter wide is cut through the circular disk of the first flapper valve 40 to form a central flapper section 60. An integral hinge area 61 connects the outer portion along one end as shown. The diameter of the central flapper section 60 is larger than the diameter of the inlet port 32. An aperture 62 in the first washer member 42, illustrated in FIG. 1, is smaller than the diameter of the central flapper section 60 of the first flapper valve 40 such that the central flapper section 60 will the cover aperture 62 and prevent a fluid flow in a direction from the outlet port 20 towards the inlet port 32. An aperture 64 in the second washer member 46, as shown in FIG. 1, is larger than the diameter of the central flapper section 60 of the second flapper valve 44 so that a fluid pressure in the direction from the inlet port 32 towards the outlet port 20 can displace the central flapper section away from the second end section 28 permitting a fluid flow through the inlet port 32. A fluid pressure in the opposite direction will hold the central flapper section 60 over the inlet port 32 preventing a fluid flow from the outlet port 20 towards the inlet port 32.

With reference to FIG. 1, a solenoid coil assembly 66 circumscribes the central portion of the piston guide 36 between the first and second radial flanges 22 and 34 with a terminal block 76 protruding through the rectangular cutout 24 of the first radial flange 22. A first magnetically permeable washer 68 is disposed between the solenoid coil assembly 66 and the first radial flange 22. A second magnetically permeable washer 70 is disposed between the solenoid coil assembly 66 and the second radial flange 34.

A first "0" ring 54, disposed between the first magnetically permeable washer 68 and a bevel at the internal end of the first cylindrical section 14 forms a fluid seal between the outlet cap 10 and the piston guide 36. In a like manner, a second "0" ring 56, disposed between the washer 70 and a bevel at the internal end of the second cylindrical section 26, forms a fluid seal between the inlet cap 12 and the piston guide 36. The first and second "0" rings 54 and 56 also produce a resilient force on the first and second magnetically permeable washers 68 and 70, resiliently holding solenoid coil assembly 66 in a fixed position between the flanges 22 and 34.

The solenoid coil assembly 66 includes a structural plastic spool 74 having a terminal block 76 integrally formed at one end thereof, a predetermined number of turns of magnetic wire wound around the spool 74 forming a solenoid coil 78, and a thick film oscillator assembly 80 fixedly attached to the plastic spool 74.

Electrical terminal blades 82 and 84, best shown in FIG. 2, provide electrical power to the oscillator assembly 80 and the solenoid coil 78 from a source of electrical power (not shown).

Figure 4:
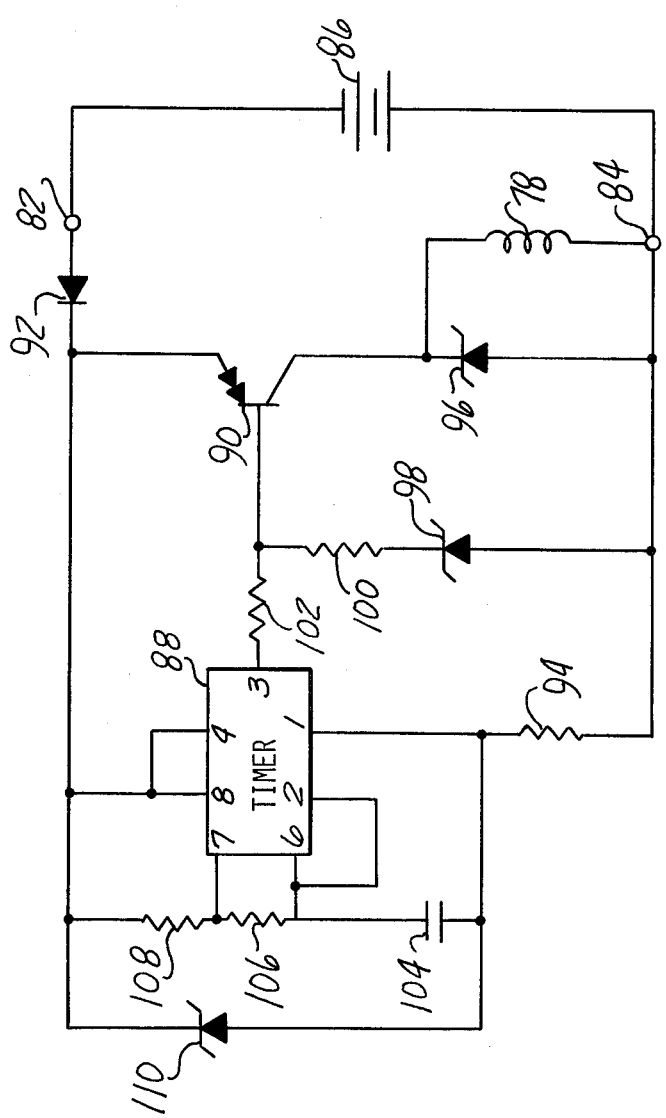
FIG. 4 is an electrical schematic of the oscillator assembly.

The circuit details of the oscillator assembly 80 are shown in FIG. 4. Referring to FIG. 4, electrical power, as from a battery 86, is applied to the input terminal blade 82 from the positive pole of the battery 86. The negative pole of the battery 86 is connected to the terminal blade 84. The input terminal blade 82 is connected to input terinals 4 and 8 of an integrated circuit timer 88, such as the integrated circuit timer, part number LM555CM, manufactured by National Semiconductor, and to the emitter terminal of a Darlington amplifier 90 through a diode 92. The terminal blade 84 is connected to an input terminal 1 of the integrated circuit timer 88 through a resistance 94, to the collector of the Darlington amplifier 90 through the solenoid coil 78 and to the base of the Darlington amplifier 90 through a zener diode 98 and a resistance 100. The base of the Darlington amplifier 90 is also connected to an output terminal 3 of the integrated circuit timer 88 through a resistance 102. The terminal 1 of the integrated circuit timer 88 is connected to the terminals 2 and 6 through a capacitance 104 and to the diode 92 through serial resistances 106 and 108. A terminal 7 of the integrated circuit timer 88 is connected to the junction between the resistances 106 and 108. A zener diode 110 is connected between the terminal 1 of the integrated circuit timer 88 and the diode 92 to prevent positive spikes of current generated by the solenoid coil and outside sources from damaging the integrated circuit timer 88. As is known with this type of integrated circuit, the resistances 106 and 108 are selected to determine the oscillation frequency of the integrated circuit timer 88. A diode 96 is connected in parallel with the solenoid coil 78 between the collector of the Darlington amplifier 90 and the terminal blade 84 and provides a low resistance return path for the current induced in the solenoid coil by the collapsing magnetic field.

The operation of the pump is as follows:

The application of electrical power to the oscillator assembly 80 activates the integrated circuit timer 88 to periodically reduce the potential at the output terminal 3 to the same potential as the terminal 1. This causes the Darlington amplifier 90 to become conductive energizing the solenoid coil 78. Energizing the solenoid coil 78 causes it to generate a magnetic field which acts on the magnetically permeable piston 38 to generate a force urging the piston 38 towards the inlet port 32. As the piston 38 moves towards the inlet port 32, the central flapper section 60 of the second mylar flapper valve member 44 closes over the inlet port 32 and the central flapper section 60 of the first mylar flapper valve 40 opens. This permits a portion of the fluid trapped between the first and second mylar flapper valve members 40 and 44 to pass into the hollow portion of the piston 38.

After a period of time, determined by the resistances 106 and 108, the output terminal 3 of the integrated circuit timer 88 becomes a positive potential placing the Darlington amplifier 90 in a non-conductive state deenergizing the solenoid coil 78. With the solenoid coil 78 de-energized, the magnetic field collapses removing the force urging the piston 38 towards the inlet port 32 and the spring 48 urges the piston 38 towards the outlet port 20. As the piston 38 moves towards the outlet port 20, the central flapper section 60 to the first mylar flapper valve member 40 closes over the aperture 62 of the first washer member 42 trapping the fluid on the outlet port side of the first mylar flapper valve member 40. Continued movement of the piston towards the outlet port 20 forces the trapped fluid out of the pump through the outlet port 20 and reduces the pressure applied to the second mylar flapper valve member 44. The reduced pressure at the second mylar flapper valve member 44 causes the central flapper section 60 to be displaced from over the inlet port 32 and permits fluid to flow into the expanding volume of reduced pressure between the first and second mylar flapper valve members 40 and 44. The piston 38 will continue to move towards the outlet port 20 until it reaches the end of its travel.

At this time, the terminal 3 of the integrated circuit timer 88 goes low causing the Darlington amplifier 90 to again become conductive and energizing the solenoid coil 78 initiating another pumping cycle.

In the assembly of the pump, the cylindrical brass piston guide 36 is inserted into the first cylindrical section 26 of the inlet cap 12, then the first and second washer members 42 and 46, the first and second flapper valve members 40 and 44, the spring 48 and the piston 38 are inserted into the piston guide 36 in their proper sequential order as indicated. The first and second magnetically permeable washers 68 and 70, the first and second "0" rings 54 and 56, and the solenoid coil assembly 66 are inserted over the external surface of the piston guide 36 in their proper sequential order. The outlet cap 10 is then inserted over the other end of the piston guide 36 with the internal surface of the first end section 16 abutting the internal end of the piston guide 36. The sleeve 50 is then placed over the first and second radial flanges 22 and 34 and the tabs are bent to lock them in place.

The advantages of the disclosed pump are:
1. The inlet and outlet caps of the pump assembly are injection molded structural plastic components requiring no machining;
2. The magnetically permeable piston is a simple cylinder;
3. The flapper valves have a simple configuration which can be made by a single punching operation;
4. The steel washers are used to concentrate magnetic return path;
5. Use of an integrated circuit timer to replace a blocking oscillator eliminates the need for special feedback windings on the spool;
6. No special tools are required for assembly; and
7. All internal parts are held in place by a single spring and pair of "0" rings.

It is not intended that the concepts disclosed be limited to the exact configuration of the pump described and illustrated in the drawing. It is submitted that the physical shapes of the component parts may be changed without departing from the spirit of the invention as described herein and set forth in the appended claims.

What is claimed is:

1. An electromagnetic fluid pump comprising:
a molded plastic inlet cap having an axial inlet port provided therein;
a molded plastic outlet cap spaced apart from said inlet cap and having an outlet port therein, said inlet cap and said outlet cap each having a radially extending flange of the same diameter;
a cylindrical non-magnetic piston guide member having one end disposed in said inlet cap and the other end disposed in said outlet cap;
a magnetic permeable cylindrical piston disposed in said piston guide member and slidable therein;
a first washer disposed adjacent to said piston and slidable therewith, said first washer having an internal diameter smaller than the internal diameter of said piston;
a first thin plastic disk disposed between said first washer, said first thin plastic disk having a diameter approximately equal to the outside diameter of said piston and a concentric circular slot partially circumscribing a central flapper member, said central flapper member having a diameter intermediate the internal diameter of said piston and said first washer;
a second washer disposed in said piston guide member adjacent to said inlet cap having an internal diameter larger than said inlet port and concentric therewith;
a second thin plastic disk disposed in said piston guide member between said second washer and said inlet cap, said second thin plastic disk having a diameter approximately equal to the diameter of said second washer and a concentric circular slot partially circumscribing a central flapper member, said central flapper member having a diameter intermediate the internal diameter of said second washer and the diameter of said inlet port;
resilient means disposed between said first and second washers for producing a force biasing said first washer, said first thin plastic disk and said piston towards said outlet port;
solenoid coil means circumscribing said piston guide member intermediate said radially extending flanges of said inlet and outlet caps;
oscillator means for periodically energizing said solenoid coil means to generate a magnetic field urging said piston towards said inlet port against said biasing force of said resilient means; and
a metal sleeve disposed over said radially extending flanges of said inlet and outlet caps and enclosing the volume therebetween; said metal sleeve including means on the opposite ends thereof for engaging the periphery of said radially extending flanges and locking said piston guide member between said inlet and outlet caps.

2. An electromagnetic fluid pump comprising:
a molded plastic outlet cap having a first cylindrical section, a first end section enclosing the end of said first cylindrical section, an outlet port passing through said first end section concentric with said first cylindrical section, and a first integral flange radially extending from the end of said first cylindrical section opposite said first end section;
a molded plastic inlet cap axially displaced from said outlet cap, said inlet cap having a second cylindrical section, a second end section enclosing the end of said second cylindrical section opposite said outlet cap; an inlet port passing through said second end section concentric with said second cylindrical section, and a second integral flange radially extending from the end of said second cylindrical section opposite said second end section, said second radially extending flange having the same diameter as said first radially extending flange;
a non-magnetic metallic cylindrical piston guide member having one end disposed inside said first cylindrical section and the other end disposed inside said second cylindrical section and a central section extending between said first and second cylindrical sections;
a magnetic permeable cylindrical piston disposed in said piston guide member and slidable therein;
a first metallic washer disposed in said cylindrical piston guide member adjacent to said cylindrical piston having an outside diameter approximately equal to the diameter of said cylindrical piston and an integral diameter smaler than the internal diameter of said cylindrical piston;
a first thin plastic disk disposed between said first metallic washer and said cylindrical piston having a diameter approximately equal to the external diameter of said first metallic washer and a concentric circular slot partially circumscribing a central flapper member, said central flapper member having a diameter intermediate the internal diameters of said first metallic washer and said cylindrical piston;
a second metallic washer disposed inside said cylindrical piston guide adjacent to said second end section having an outside diameter smaller than the internal diameter of said cylindrical piston guide member and an internal diameter larger than the diameter of said inlet port;
a second thin plastic disk disposed between said second washer and said second end section having a diameter approximately equal to the outside diameter of said second washer and a concentric circular slot, partially circumscribing a central flapper member, said central flapper member having a diameter intermediate the internal diameter of said second metallic washer and the diameter of said inlet port;

resilient means disposed between said first and second metallic washers for producing a force biasing said first metallic washer, said first thin plastic disk and said piston towards said outlet port and biasing said second metallic washer and second thin plastic disk towards said inlet port;

solenoid coil means circumscribing said central section of said piston guide member between said first and second radially extending flanges;

oscillator means fixedly attached to said solenoid coil means, said oscillator means responsive to receive electrical power for periodically energizing said solenoid coil means to generate a magnetic field urging said piston towards said inlet port against the force of said resilient means; and a metal sleeve disposed over said first and second radially extending flanges and enclosing the volume therebetween, said metal sleeve including means on the opposite ends thereof for engaging the periphery of said first and second radially extending flanges and locking said piston guide member between said inlet and outlet caps.

3. The fluid pump of claim 2 wherein said oscillator means includes an integrated circuit timer.

4. The fluid pump of claim 3 wherein said integrated circuit timer activates a Darlington amplifier connected in series with said solenoid coil means.

5. The fluid pump of claim 2 wherein said solenoid coil means comprises:

a coil spool having a predetermined number of turns of magnetic wire;

a first magnetically permeable washer disposed between one side of said spool and the internal face of said integral first flange; and a second magnetically permeable washer disposed between the other end of said spool and the internal face of said integral second flange.

6. The fluid pump of claim 5 further comprising a pair of resilient ring members circumscribing said piston guide member, one of said pair of ring members disposed between the internal face of said integral first flange and said first magnetically permeable washer and the other of said pair of ring members disposed between the internal face of said integral second flange and said second magnetically permeable washer, said pair of resilient ring members resiliently holding said first and second magnetically permeable washers againt the opposite ends of said spool.

7. The fluid pump of claim 6 wherein said means for engaging said first and second flanges of said metal sleeve is a plurality of tabs disposed on the opposite ends of said metal sleeve bent to engage the periphery of said integral first and second flanges.

8. The fluid pump of claim 7 further comprising:

an inlet hose mount protruding from the external face of said second end section and having said inlet port extending concentrically therethrough; and an outlet hose mount protruding from the external face of said first end section and having said outlet port extending concentrically therethrough.

9. The fluid pump of claim 8 wherein said inlet hose mount has a base portion parallel to said second cylindrical section and an end portion extending normal to said base portion.

* * * * *

UNITED STATES PATENT AND TRADEMARK OFFICE
CERTIFICATE OF CORRECTION

PATENT NO. : 4,487,556
DATED : December 11, 1984
INVENTOR(S) : Michael V. Wiernicki It is certified that error appears in the above-identified patent and that said Letters Patent is hereby corrected as shown below:

Column 2, line 49, after "second" insert ---- mylar flapper ----.

Column 2, line 67, delete "the cover" and insert ---- cover the ----.

Column 3, line 31, after "holding" insert ---- the ----.

Column 3, line 49, delete "terinals" and insert ---- terminals ----.

Column 6, line 48, delete "integral diameter smaler" and insert ---- internal diameter smaller ----.

Column 8, line 17, delete "washers againt" and insert ---- washers against ----.

Signed and Sealed this

Thirtieth Day of April 1985

[SEAL]

Attest:

DONALD J. QUIGG

*Attesting Officer*  *Acting Commissioner of Patents and Trademarks*

UNITED STATES PATENT AND TRADEMARK OFFICE
CERTIFICATE OF CORRECTION

PATENT NO.  : 4,487,556
DATED       : December 11, 1984
INVENTOR(S) : Michael Vincent Wiernicki It is certified that error appears in the above-identified patent and that said Letters Patent is hereby corrected as shown below:

Column 5, line 48, after " washer " insert ---- and said piston ----.

Signed and Sealed this

Twenty-first Day of October, 1986

[SEAL]

Attest:

DONALD J. QUIGG

Attesting Officer     Commissioner of Patents and Trademarks